(12) United States Patent
Gaige

(10) Patent No.: US 10,059,144 B2
(45) Date of Patent: Aug. 28, 2018

(54) REMOTE ACTING ARTICULATING TOOL HOLDER

(71) Applicant: Mark Gaige, Cambridge, ID (US)

(72) Inventor: Mark Gaige, Cambridge, ID (US)

( * ) Notice: Subject to any disclaimer, the term of this patent is extended or adjusted under 35 U.S.C. 154(b) by 0 days.

(21) Appl. No.: 15/250,386

(22) Filed: Aug. 29, 2016

(65) Prior Publication Data

US 2016/0368311 A1 Dec. 22, 2016

Related U.S. Application Data

(63) Continuation-in-part of application No. 14/630,223, filed on Feb. 24, 2015, now abandoned.

(60) Provisional application No. 62/373,006, filed on Aug. 10, 2016, provisional application No. 61/966,972, filed on Mar. 7, 2014, provisional application No. 61/966,379, filed on Feb. 24, 2014.

(51) Int. Cl.

| | |
|---|---|
| *A46B 17/02* | (2006.01) |
| *B44D 3/12* | (2006.01) |
| *F16B 7/10* | (2006.01) |
| *A46B 5/00* | (2006.01) |
| *B25G 1/04* | (2006.01) |
| *B05B 15/654* | (2018.01) |
| *B05B 13/04* | (2006.01) |

(52) U.S. Cl.
CPC .............. *B44D 3/123* (2013.01); *A46B 5/005* (2013.01); *A46B 5/0041* (2013.01); *A46B 5/0045* (2013.01); *A46B 17/02* (2013.01); *B05B 15/654* (2018.02); *B25G 1/04* (2013.01); *F16B 7/10* (2013.01); *A46B 2200/202* (2013.01); *B05B 13/0405* (2013.01)

(58) Field of Classification Search
CPC ..... A46B 5/0045; A46B 5/0041; A46B 5/005; A46B 17/02; B44D 3/123; B05B 15/064; B25J 1/04

See application file for complete search history.

(56) References Cited

U.S. PATENT DOCUMENTS

| | | | | |
|---|---|---|---|---|
| 1,416,081 | A * | 5/1922 | White | A46B 17/02 |
| | | | | 15/144.1 |
| 1,663,439 | A * | 3/1928 | Christianson | A47L 11/38 |
| | | | | 401/137 |
| 5,802,658 | A * | 9/1998 | Ward | A46B 7/02 |
| | | | | 15/144.2 |
| 6,056,450 | A * | 5/2000 | Walling | F16M 11/10 |
| | | | | 352/243 |
| 6,976,644 | B2 * | 12/2005 | Troudt | B05B 15/066 |
| | | | | 239/525 |
| 9,237,799 | B1 * | 1/2016 | Manning, Jr. | A46B 17/02 |

* cited by examiner

*Primary Examiner* — Jennifer C Chiang

(74) *Attorney, Agent, or Firm* — Robert L. Shaver; Scott D. Swanson; Shaver & Swanson, LLP

(57) ABSTRACT

An articulated tool holder on an extension pole. The device uses an extension pole with a pivoting tool holder on the end of the pole. The tool holder is connected to a sliding hand grip on the extension pole, movement of which causes the tool holder to rotate so the tool can be used in different positions from the extension pole.

7 Claims, 8 Drawing Sheets

REMOTE ACTING ARTICULATING TOOL HOLDER

PRIORITY/CROSS-REFERENCE TO RELATED APPLICATIONS

This application claims the benefit of U.S. Provisional Application No. 61/966,379, filed Feb. 24, 2014, and the U.S. Provisional Application No. 61/966,972, filed Mar. 7, 2014, and U.S. Provisional Application No. 62/373,006, filed Aug. 10, 2016, and the Non-Provisional application Ser. No. 14/630,223, filed Feb. 24, 2015 the disclosure of which is incorporated by reference.

TECHNICAL FIELD

The presently disclosed and claimed technology generally relates to tool holder on a pole, and more particularly to a tool holder which articulates to different positions on the pole in two planes.

BACKGROUND

There are many times when a hand tool is used and the object it is to be used on is just out of reach of the user. At that time the user can get a stepladder, stand on a chair or put the tool he is using on a pole in order to extend his reach. An example of putting the tool on a pole is in the case of a paint roller which is screwed on to the end of an extension pole so that the user can stand on the floor and paint up to the ceiling. There are situations to where simply adding the tool to the end of the pole is not useful enough. An example would be someone is trying to paint the top edge of a door molding and the door molding is more than six feet in the air. The paint brush or roller might not be able to be turned to reach the top edge of a door molding such as this. Similarly, the paint may need to be applied to the edge of decking material. A user could reach over the railing of the deck and a paint brush on an extension pole would reach the edge of the deck, but not at an angle which would be useful for painting the edge of the deck. What is needed in this and many other uses of tools is a tool holder which articulates, under the control of the user. A tool holder which is adjustable is not sufficient because the tool may need to be at different angles for different parts of the job.

Another example of a tool being used at the end of a pole in order to change the position of the tool is when a camera is placed on the end of a pole for use. This sometimes occurs when a person has a video camera attached to a hiking pole, and he wants to use the hiking pole to get additional distance from himself, or height above himself for a better angle of the video. Just attaching a camera to the end of a hiking pole or other pole accomplishes something, but it would be much more useful if the user could readily cause the tool holder, in this case a camera holder, to be rotated. This rotation could be utilized in order to get a panoramic view, or to change the angle at which the camera is placed. Satisfying these needs for movement of a tool in a tool holder is the object of the present technology.

SUMMARY OF THE DISCLOSURE

The disclosed technology is a Remote Acting Articulating Tool Holder (RAATH). It is made up of several parts, one being an extension pole. The extension pole has a first and second end, and the second end of the pole has an attached tool holder. The extension pole can be hollow, as in a tube, or it can be solid. It can be round, square, triangular, oval or other suitable shapes. It can telescope in and out. Attached to the extension pole is a hand grip which generally surrounds the pole and is free to slide up and down the pole. The user places one hand on the extension pole and one hand on the hand grip and slides the hand grip up and down the pole. The hand grip is attached to the tool holder which is on the second end of the pole. The attachment between the hand grip and the tool holder may be by a flexible cord such as a rope or string, or it may be a solid connection such as a rod or bar. The tool holder is made to rotate in both directions, so if a flexible rope or cord is utilized to rotate the tool holder, the tool holder would be loaded with a spring to move it back to a resting position when the rope is released. The tool holder is made to rotate in two planes, defined as the plane that is coplanar with the long axis of the pole, and one that is normal to the first plane. Thus the tool holder can move back and forth in relation to the pole, and can also rotate around the pole.

The tool holder is built so that a tool may be inserted into the tool holder, and the tool may be removed when the user desires to. This allows multiple tools to be used in the tool holder.

One type of tool which the articulating tool holder is well adapted for is a paint brush, and multiple sizes and types of paint brushes can be inserted into the tool holder, and removed for cleaning or replacement. Another type of tool which may be placed in the tool holder is a paint spraying nozzle. The paint spraying nozzle may be a can of pressurized spray paint, and it may also be a spray nozzle which is attached to a hose, which goes down the pole and attaches to a reservoir of paint. A reservoir of paint may be attached to the pole itself, it may be separate from the pole and sit on the ground, or it may be on the user's body in the form of a back pack or a can of paint suspended on the front or side of the user. The tool can also be made for spraying a liquid material other than paint such as insecticide, deck stain, varnish, other exterior finishes, herbicide, pesticide, fertilizer or other liquids. Another tool which works with the tool holder is a camera, such as a video or still camera.

Another type of tool that is useful to place in the tool holder portion of the device is a camera, such as a video camera. By placing a video camera in the tool holder, and having the tool holder be movable, a user is allowed to have the video camera view under a deck, on top of ledges, on top of roofs, in roof gutters, in an attic, in a crawl space, and various other positions which are not accessible for a hand held camera. The disclosed devise can be made as a kit which is assembled on an existing pole, such as a hiking pole or a painting extension pole. Such a kit would have a slidable hand grip, a tool holder attached to the end of the pole, and a connection between the hand grip and the tool holder. In the case of the camera, a hiking pole can serve as the extension pole, with a slidable hand grip on the pole, and a swiveling tool holder mounted on the end of the pole.

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the inventive concept(s) of the application, which is measured by the claims, nor is it intended to be limiting as to the scope of the inventive concept(s) in any way.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE EXEMPLARY EMBODIMENTS

Figure 1:
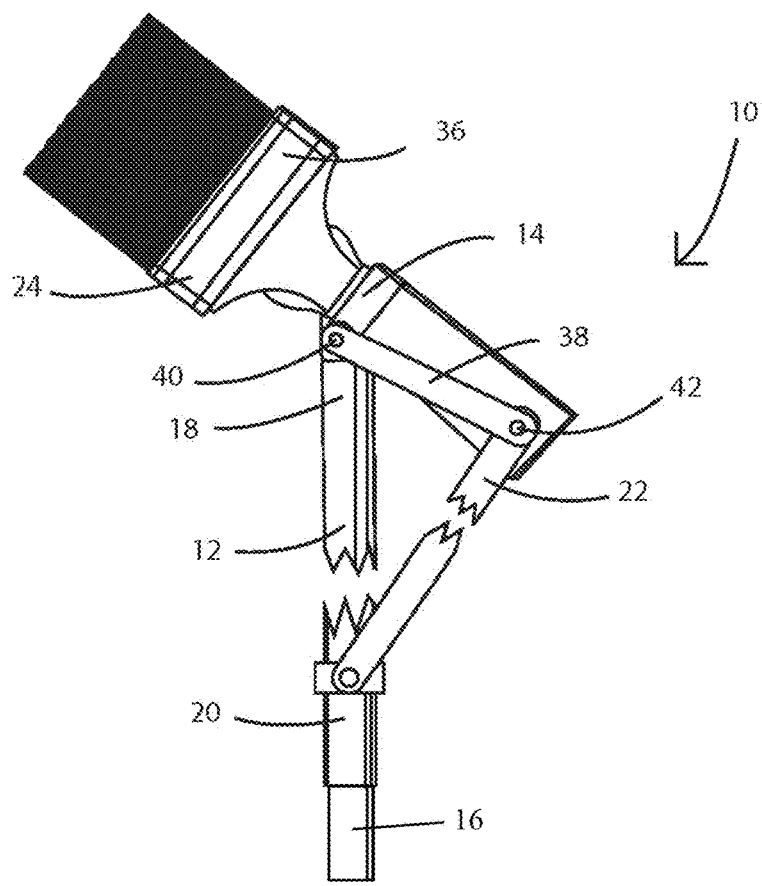
FIG. 1 is a side view of the disclosed Remote Acting Articulating Tool Holder, with a print brush as the tool.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

A preferred embodiment of the disclosed technology is shown FIGS. 1 through 13. FIG. 1 shows the disclosed device in use with a paint brush. Show in FIG. 1 is an embodiment of the disclosed remote acting articulating tool holder (RAATH) 10, in use with a paint brush. Shown is an extension pole 12, with a first end 16 and a second end 18. Attached to the second end 18 is a tool holder 14. Shown is a slideable hand grip 20. The tool holder and tool are connected to the slidable hand grip 20 by a connection, so that movement of the hand grip 20 causes the tool and tool holder 14 to rotate in a plane parallel to the long axis of the extension pole. The connection between the slideable hand grip 20 can be a rigid connecting rod 22, so that when the slideable hand grip 20 is moved up and down the extension pole 12, the tool holder 14 and the tool 36 move with it. The connection can also be a flexible cord, which would move the tool holder 14 when the slideable hand grip is pulled down, and a spring would pull the tool holder 14 into a rest position when the slidable hand grip 20 is moved up the extension pole 12, as the flexible cord is relaxed. In any case, the connection from the hand grip 20 to the tool or tool holder is a direct connection, and does not go through a pivot point or lever arm. The tool holder is made to rotate in two planes, defined as a first plane that is coplanar with the long axis of the pole, and a second plane that is normal to the first plane. Thus the tool holder can move back and forth in relation to the pole, and can also rotate around the pole.

Figure 13:
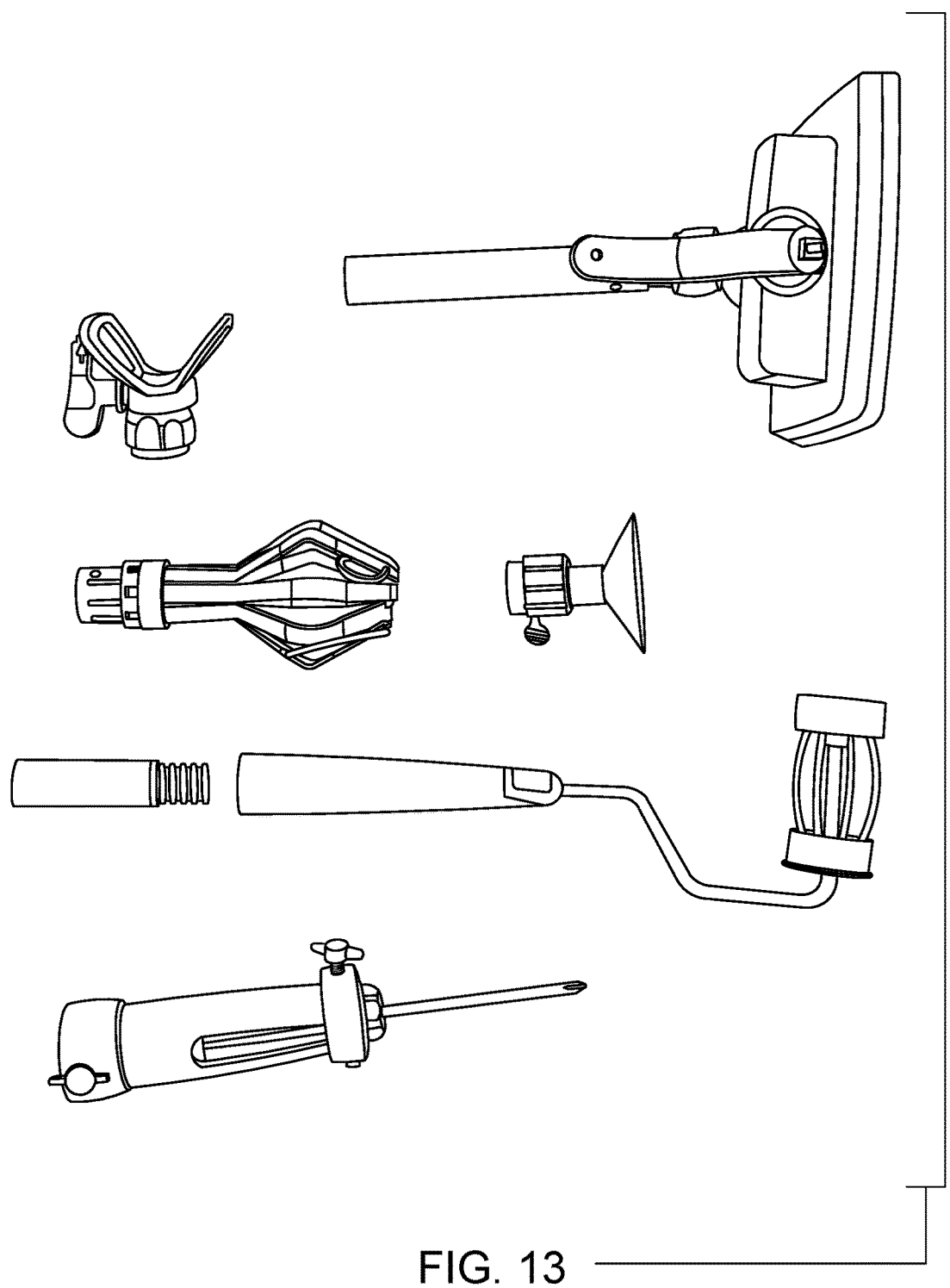
FIG. 13 is a top view of tools which can be used in the disclosed Remote Acting Articulating Tool Holder.

A number of different tools 36 can be utilized with the tool holder 14, such as the paint brush 24 shown, a camera 26, a paint roller, a paint pad, a light bulb tool, a suction cup, a screw driver or scraper holder, a spray nozzle 28 for applying liquids. Liquids that may be applied may be water, paint, stain, sealant, insecticide, herbicide, cleaner, detergent, soap, solvent, or other liquids commonly applied by spray nozzle. FIG. 13 shows some tool which may be used in the device.

Figure 2:
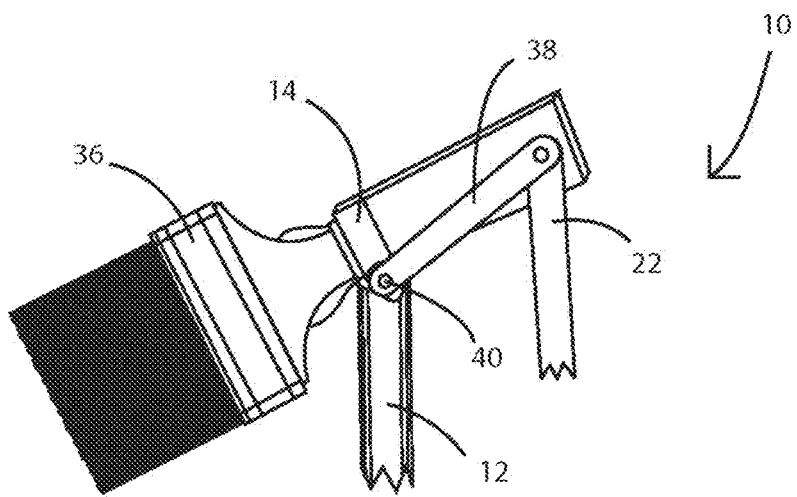
FIG. 2 is a side view of the disclosed Remote Acting Articulating Tool Holder, with a print brush as the tool and with the tool holder moved from the position shown in FIG. 1.

In the embodiment shown in FIGS. 1 and 2, a linkage bar 38 is pivotally attached to the pivot point 40, and at the other end to the second end 42 of the tool or tool holder. The linkage bar 38 is optional, and the device works without it.

The extension pole 12 can be sized according to the job to be done, but a typical length can be from 3 feet to 10 feet. The extension pole 12 can be wood, plastic, tubular metal, or other suitable material. A typical diameter of the extension pole 12 can be approximately 1"-2", depending on the material used for the pole and the purpose of the RAASH. The extension pole has a plane running through the longitudinal axis of the pole, and the tool holder pivots on said second end of said pole in the plane running through the longitudinal axis of the extension pole.

Figure 3:
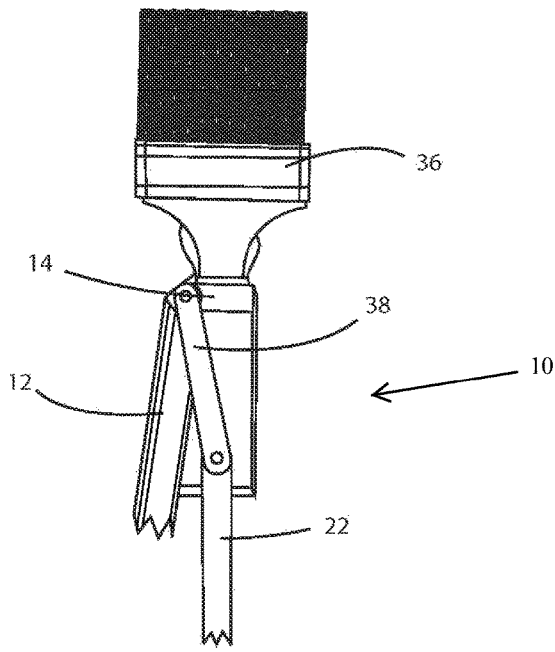
FIG. 3 is a side view of the disclosed Remote Acting Articulating Tool Holder, with a print brush as the tool and moved from the position shown in FIG. 2 or 3.

FIGS. 1, 2, and 3 show the tool 36 and tool holder 14 in different positions, which demonstrates some positions the tool 36 and tool holder 14 available to the user.

Figure 4:
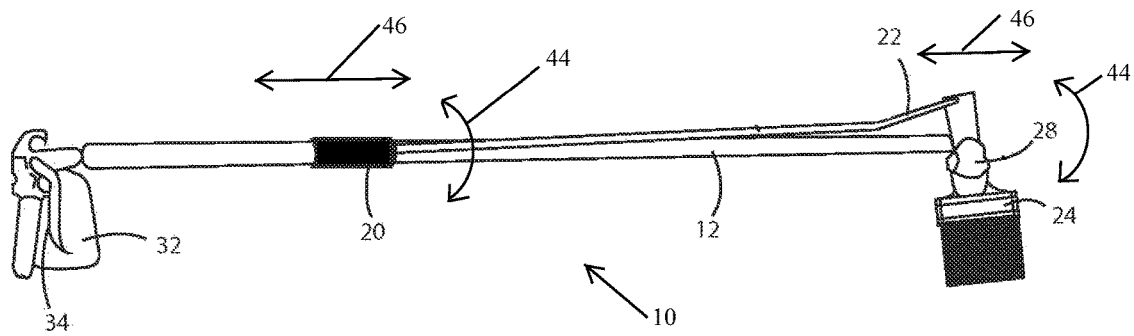
FIG. 4 is a side view of the disclosed Remote Acting Articulating Tool Holder, showing a liquid trigger and liquid vessel for dispensing liquid at a spray nozzle on the tool holder, with the tool holder also holding a brush.

FIG. 4 shows a version of the RAATH 10 in which the tool holder 14 holds both a paint brush 24 and a spray nozzle 28. At the first end of the extension pole 12 is a liquid vessel 32 which can hold the liquid to be sprayed. The liquid vessel 32 can also be unattached to the pole 12, and can be a container placed on the ground, a container worn as a backpack, or a container worn on the user's body such as on a belt. A paint activation trigger 34 is present at the first end of the extension pole 12. In the embodiment shown in FIG. 4 the connecting rod 22 is a solid wire, and can be secured to the pole 12 by guides.

Figure 5:
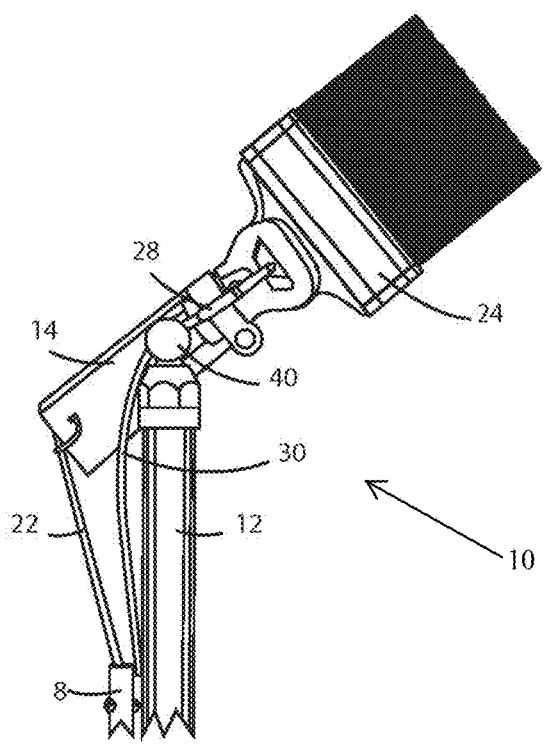
FIG. 5 is a side view of the disclosed Remote Acting Articulating Tool Holder, showing the spray nozzle and a liquid tube for carrying liquid such as paint to the spray nozzle.

FIG. 5 is a closer view of the embodiment shown in FIG. 4. It includes a paint brush 24, a spray nozzle, a connecting rod 22, a pivot point 40, and a liquid tube 30. The liquid tube 30 can be internal to the pole 12, or external to the pole as shown.

Figure 6:
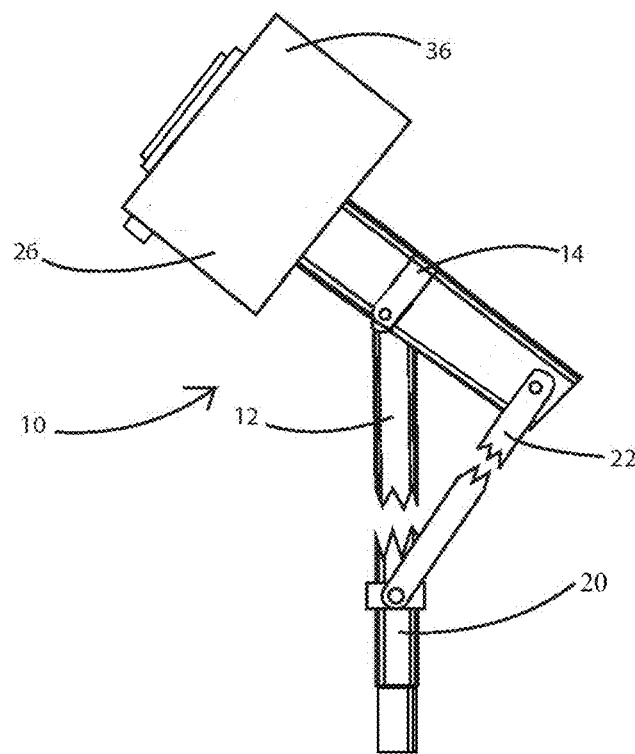
FIG. 6 is a side view of the disclosed Remote Acting Articulating Tool Holder, with a camera shown as the tool.

FIG. 6 shows an embodiment of the RAATH 10 in which the tool 36 is a camera 26, such as a video camera or a still camera. The mount of the camera can be movable, so the camera may be pointed in different directions as it rotates.

Figure 7:
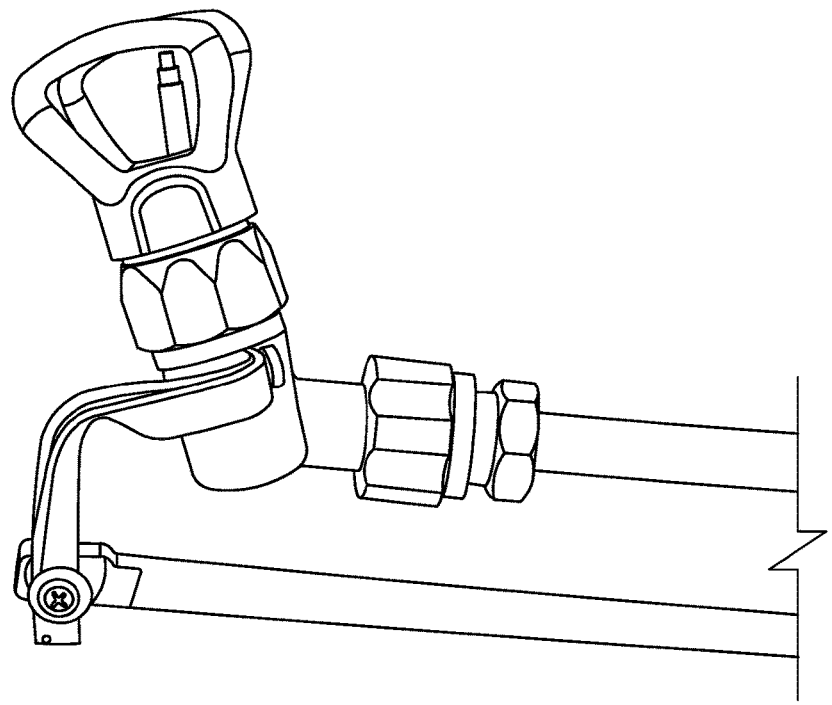
FIG. 7 is a side view of the disclosed Remote Acting Articulating Tool Holder, with a paint spray nozzle as the tool, pointed upward.

FIG. 7 is a side view of the disclosed Remote Acting Articulating Tool Holder, with a paint spray nozzle as the tool, pointed upward. This is accomplished by a rotating connection of the paint nozzle to the extension pole 12. The paint nozzle is turned in a second plane 44 normal to the long axis of the pole 12 by rotation of the hand grip 20, which is attached to the spray nozzle and tool holder by a connecting rod 22. When the hand grip 20 is rotated around the pole, the tool holder and spray nozzle rotate in the second plane 44. The hand grip 20 is movable on a first plane 46 parallel to the long axis of the pole 12 as well. Reference numbers and shown movement lines are for illustrative purposes only. The overall inventive concept is identified by the claims.

Figure 8:
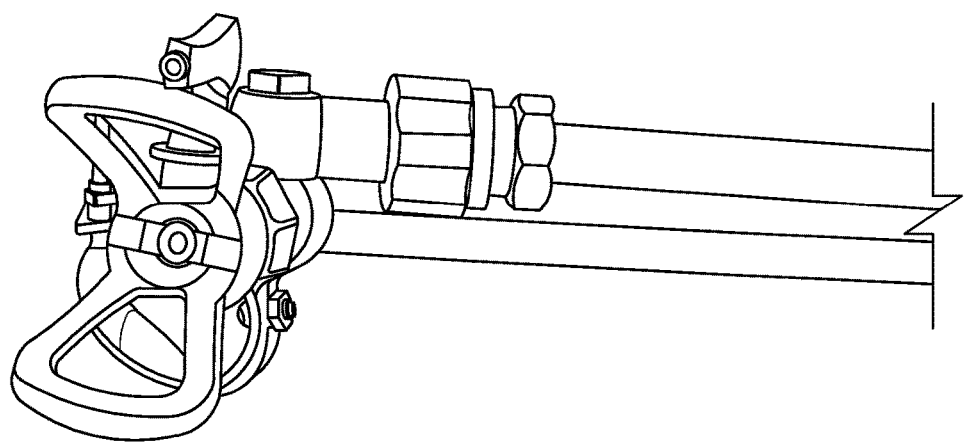
FIG. 8 is a side view of the disclosed Remote Acting Articulating Tool Holder, with a paint spray nozzle as the tool, pointed to the side.

FIG. 8 is a side view of the disclosed Remote Acting Articulating Tool Holder, with a paint spray nozzle as the tool, pointed to the side.

Figure 9:
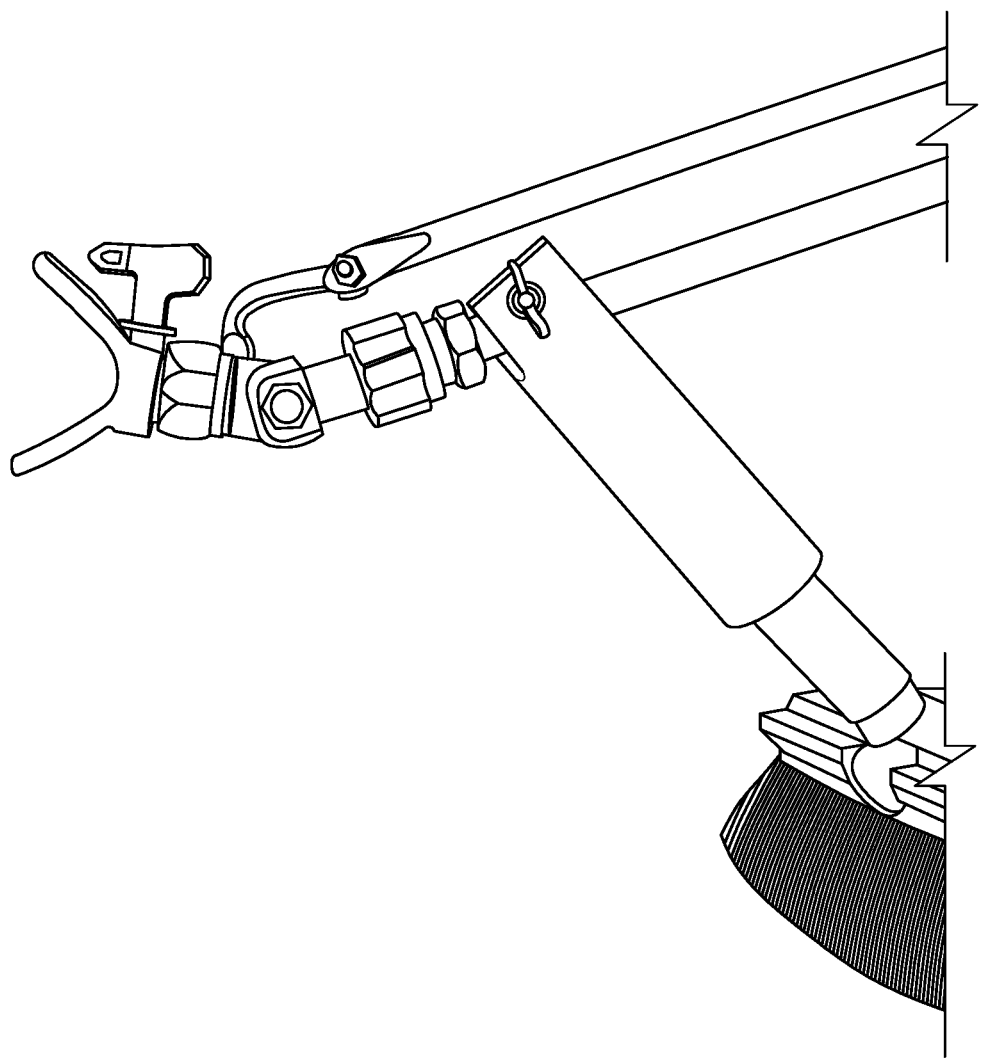
FIG. 9 is a side view of the disclosed Remote Acting Articulating Tool Holder, with a paint spray nozzle as the tool, pointed forward.

FIG. 9 is a side view of the disclosed Remote Acting Articulating Tool Holder, with a paint spray nozzle as the tool, pointed forward.

Figure 10:
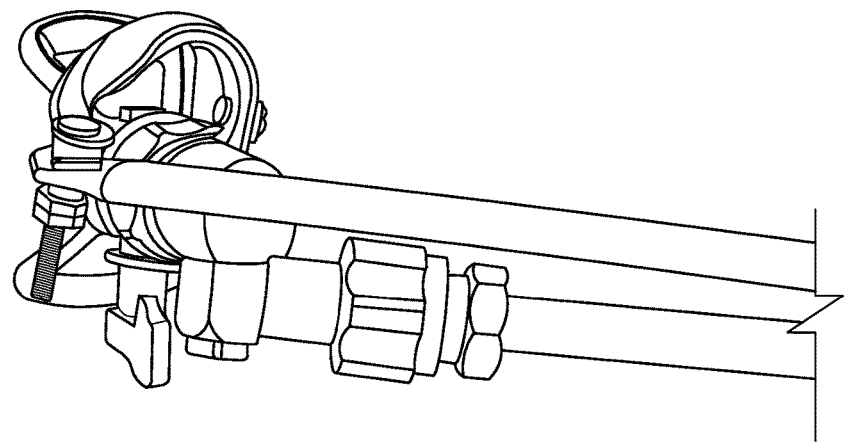
FIG. 10 is a side view of the disclosed Remote Acting Articulating Tool Holder, with a paint spray nozzle as the tool, pointed to the side.

FIG. 10 is a side view of the disclosed Remote Acting Articulating Tool Holder, with a paint spray nozzle as the tool, pointed to the side.

Figure 11:
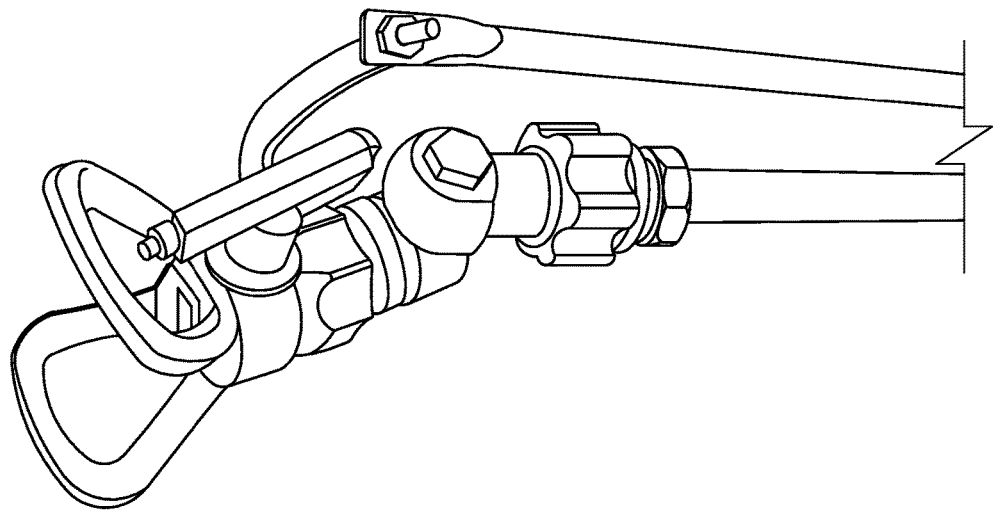
FIG. 11 is a perspective view of the disclosed Remote Acting Articulating Tool Holder, with a paint spray nozzle as the tool, pointed forward.

FIG. 11 is a perspective view of the disclosed Remote Acting Articulating Tool Holder, with a paint spray nozzle as the tool, pointed forward.

Figure 12:
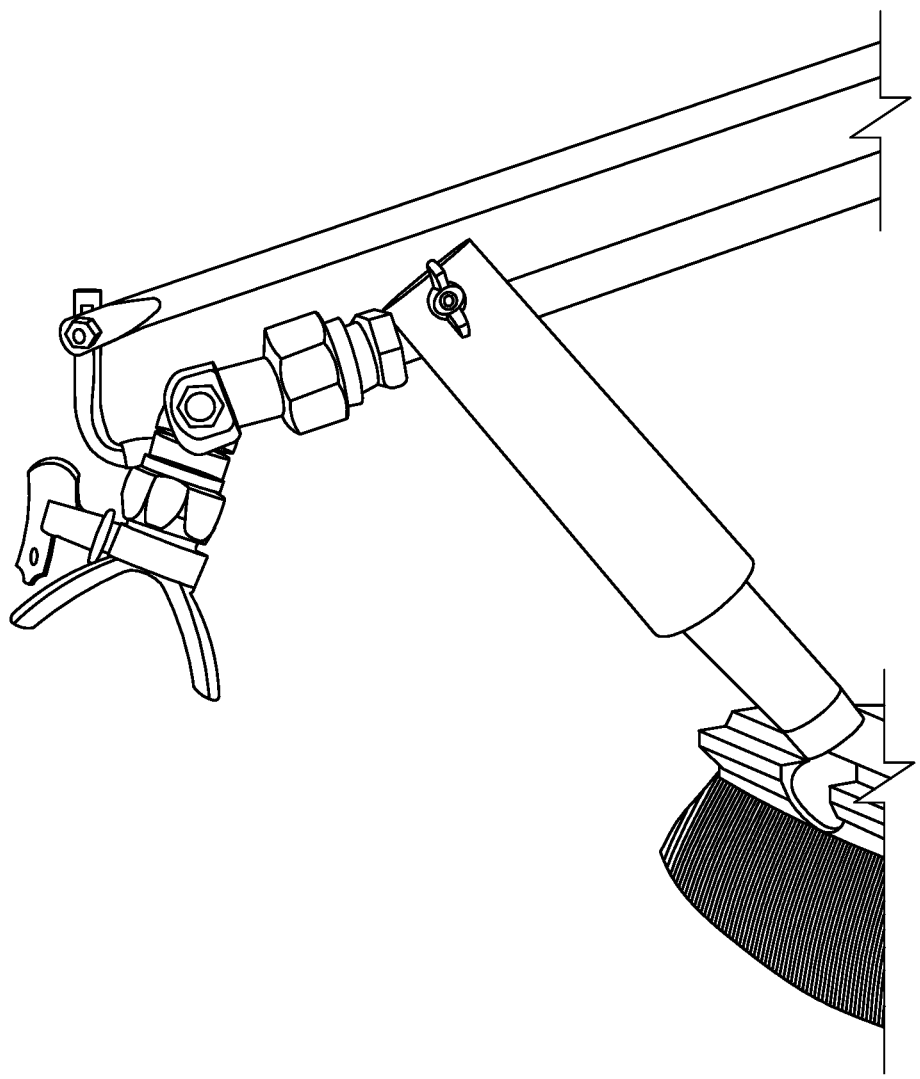
FIG. 12 is a side view of the disclosed Remote Acting Articulating Tool Holder, with a paint spray nozzle as the tool, pointed downward.

FIG. 12 is a side view of the disclosed Remote Acting Articulating Tool Holder, with a paint spray nozzle as the tool, pointed downward.

While certain exemplary embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. A remote acting articulating tool holder, comprising:
    an extension pole with a first end and a second end, configured for attachment of a tool holder to said second end of said pole;
    a slidable hand grip substantially encircling said pole and slidable on said pole, with said hand grip attached to said tool holder, with said hand grip movable parallel to the long axis of the pole as well as in the plane normal to the long axis of the pole;
    a tool holder pivotally attached to said second end of said pole, with said tool holder configured to hold a selected tool and movable in a first plane coplanar with the long axis of the extension pole, and also in a second plane normal to the long axis of the extension pole; and
    a connection between said hand grip and said tool holder which is a direct connection, so that when said hand grip is moved along said pole, said tool holder is caused to pivot on said second end of said pole in a plane running through the longitudinal axis of the extension pole, and when said hand grip is rotated around said extension pole, said tool holder with said tool is rotated in a plane normal to the first plane.

2. The remote acting articulating tool holder of claim 1, in which said tool holder is configured to hold a paint brush.

3. The remote acting articulating tool holder of claim 1, which further comprises a paint activation trigger adjacent to the first end of said pole, a paint transport line that extends from a paint storage vessel to said trigger, and to a paint spray nozzle on the second end of said pole.

4. The remote acting articulating tool holder of claim 1 in which said connection between said hand grip and said tool holder is a rigid linkage.

5. The remote acting articulating tool holder of claim 1 in which said tool is a camera.

6. A remote acting articulating tool holder, comprising:
    an extension pole with a first end and a second end, configured for attachment of a paint brush to said second end of said pole;
    a slidable hand grip substantially encircling said pole and slidable on said pole, with said hand grip attached to said tool holder with said hand grip attached to said tool holder, with said hand grip movable parallel to the long axis of the pole as well as in the plane normal to the long axis of the pole;
    a spray nozzle pivotally and rotational attached to said second end of said pole and attached by a linkage bar to said slidable hand grip; and
    said linkage bar attached to said slidable hand grip and said tool holder, so that when said hand grip is moved along said pole, said spray nozzle is caused to pivot on said second end of said pole in a first plane running through the longitudinal axis of the extension pole, and when said hand grip is rotated around said extension pole, said tool holder with said tool is rotated in a second plane normal to the first plane.

7. The remote acting articulating tool holder of claim 6, in which said tool holder is configured to hold a paint brush, and said spray nozzle is attached to said tool holder.

* * * * *